(12) United States Patent
Joshi

(10) Patent No.: US 10,456,813 B1
(45) Date of Patent: Oct. 29, 2019

(54) NON-AQUEOUS STRIPPING COMPOSITION AND A METHOD OF STRIPPING AN ORGANIC COATING FROM A SUBSTRATE

(71) Applicant: Atotech Deutschland GmbH, Berlin (DE)

(72) Inventor: Nayan H. Joshi, Berlin (DE)

(73) Assignee: Atotech Deutschland GmbH, Berlin (DE)

( * ) Notice: Subject to any disclaimer, the term of this patent is extended or adjusted under 35 U.S.C. 154(b) by 0 days.

(21) Appl. No.: 16/061,689

(22) PCT Filed: May 8, 2017

(86) PCT No.: PCT/EP2017/060884
§ 371 (c)(1),
(2) Date: Jun. 13, 2018

(87) PCT Pub. No.: WO2017/194449
PCT Pub. Date: Nov. 16, 2017

(30) Foreign Application Priority Data

May 10, 2016 (EP) .................................... 16168983

(51) Int. Cl.
C11D 7/50 (2006.01)
B08B 3/08 (2006.01)
C09D 9/04 (2006.01)
C09D 9/00 (2006.01)

(52) U.S. Cl.
CPC ................ B08B 3/08 (2013.01); C09D 9/005 (2013.01); C09D 9/04 (2013.01)

(58) Field of Classification Search
CPC ......................... C11D 11/0041; C11D 7/5004
USPC ....................................................... 510/201
See application file for complete search history.

(56) References Cited

U.S. PATENT DOCUMENTS

| | | | |
|---|---|---|---|
| 3,790,489 A | 2/1974 | Shoemaker et al. | |
| 5,405,548 A | 4/1995 | Distaso | |
| 5,977,042 A | 11/1999 | Hernandez et al. | |
| 6,130,192 A | 10/2000 | Vitomir | |
| 6,855,210 B1 | 2/2005 | Dostie et al. | |
| 7,151,080 B2 | 12/2006 | Dostie et al. | |
| 9,593,247 B2 | 3/2017 | Joshi et al. | |
| 2003/0119688 A1 | 6/2003 | Rehm et al. | |
| 2005/0233936 A1* | 10/2005 | Dostie | C11D 1/72 510/421 |
| 2006/0089281 A1* | 4/2006 | Gibson | C09D 9/005 510/201 |
| 2009/0032069 A1* | 2/2009 | Wilson | C09D 9/04 134/38 |

FOREIGN PATENT DOCUMENTS

| | | |
|---|---|---|
| CN | 101058691 | 10/2007 |
| CN | 101373339 | 2/2009 |
| CN | 102344712 | 2/2012 |
| CN | 102372943 | 3/2012 |
| EP | 1119591 | 8/2001 |
| EP | 1319694 | 6/2003 |
| WO | 2013117757 | 8/2013 |

OTHER PUBLICATIONS

Ma Zheng, et al., "Applied Chemistry", Shaanxi Education College, p. 421.
Official Action for corresponding Chinese Application No. 201780006863.1 dated Jan. 23, 2019.
PCT/EP2017/060884; PCT International Search Report and Written Opinion of the International Searching Authority dated Jul. 18, 2017.

* cited by examiner

Primary Examiner — Gregory E Webb
(74) Attorney, Agent, or Firm — Renner, Otto, Boisselle & Sklar, LLP

(57) ABSTRACT

To achieve efficient stripping of organic coatings from sensitive substrate without affecting the substrate surface, a novel non-aqueous stripping composition and method are provided. The stripping composition comprises: A. at least one high-boiling solvent selected from the group, consisting of alcohols having general chemical formula R—OH, wherein R is a $C_4$-$C_{30}$ hydrocarbon group, wherein the high-boiling solvent has a boiling point of at least 100° C.; B—at least one high-boiling co-solvent selected from the group, consisting of high-boiling glycols, glycol ethers and amine compounds, wherein the high-boiling co-solvent has a boiling point of at least 100° C.; and C—at least one pH-active agent either selected from the group, consisting of acid compounds or selected from the group, consisting of hydroxide compounds.

20 Claims, No Drawings

NON-AQUEOUS STRIPPING COMPOSITION AND A METHOD OF STRIPPING AN ORGANIC COATING FROM A SUBSTRATE

The present application is a U.S. National Stage Application based on and claiming benefit and priority under 35 U.S.C. § 371 of International Application No. PCT/EP2017/060884, filed 8 May 2017, which in turn claims benefit of and priority to European Application No. 16168983.1 filed 10 May 2016, the entirety of both of which is hereby incorporated herein by reference.

FIELD OF THE INVENTION

The present invention relates to a non-aqueous stripping composition and to a method of stripping an organic coating from a substrate using this stripping composition. More particularly, the invention relates to a method of removing organic coatings, such as epoxy coatings, polyester coatings, polyurethane coatings, acrylic coatings, and different types of powder coatings, or residues thereof from substrates like steel and stainless steel and also from soft metal substrates, like, aluminium, zinc, and magnesium substrates, and from substrates having metallic coatings made of soft metals, such as galvanized steel, as well as from engineering plastics substrates.

BACKGROUND OF THE INVENTION

Removal of organic coatings from substrates is extremely important in many industries. In particular, organic coatings or residues need to be removed from substrates either for the re-working of a part which has a flawed coating or for reclaiming parts in which the substrate is intact but which requires residues to be removed and/or new coatings to be applied.

From U.S. Pat. No. 3,790,489 A, a paint stripping compound is known which is described to be used at elevated temperatures which has a caustic base of an alkali metal hydroxide, an alkali metal nitrate, an alkali metal chloride, a catalyst selected from the group of alkali metal permanganates, manganese dioxide and $Cr_2O_3$, and preferably an alkali metal carbonate. The components are fused and maintained at a temperature between 800° F. (about 426° C.) and 900° F. (about 482° C.) for stripping.

However, certain metals, such as zinc, aluminum and magnesium or metallic coatings comprised of metals or alloys thereof, as well as other metals, alloys, and even non-metallic substrates, are subject to chemical attack or destruction under such conditions as taught in U.S. Pat. No. 3,790,489 A. Thus, such caustic compositions are typically avoided in prior art teachings when removing coatings from metals, such as from aluminum, magnesium and zinc.

One prior art approach which is based on high boiling point glycol in a stripping composition is taught by U.S. Pat. No. 6,855,210 B1 and U.S. Pat. No. 7,151,080 B2, wherein stripping from the substrate is achieved by using a composition comprising from about 40% by weight to about 98.9% by weight of a high-boiling alcohol, from about 1% by weight to about 60% by weight of a non-ionic surfactant, and from about 0.1% by weight to about 10% by weight of an alkali hydroxide or mixture of alkali hydroxide, wherein said composition is anhydrous and essentially free of any amines. This method however, requires relatively high operating temperature range (operating temperature is reported to be between 225° F. (about 107° C.) and 350° F. (about 176° C.), more preferably between 250° F. (about 121° C.) and 325° F. (about 162° C.)), thus consuming much energy and also creating some safety concerns. Therefore, it requires an adequate set-up of the processing line for operator's safety. Moreover, as it requires relatively high operating temperature, it has limited use to strip/remove organic coatings from plastic substrates.

As prior art methods (especially U.S. Pat. No. 6,855,210 B1, U.S. Pat. No. 7,151,080 B2) make use of nonylphenol ethoxylate which has proved to be hazardous, WO 2013/117757 A1 teaches another non-aqueous stripping composition which comprises a source of hydroxide ions, a high-boiling alcohol having a boiling point of at least 150° C. and at least one surfactant represented by chemical formula R—O—$(CH_2CH_2O)_n$H, wherein R is an alkyl chain, linear or branched having a 2 to 30 carbon atom chain length. Operating temperature is reported to be between 100° C. and 200° C. The composition is preferably amine free in order to avoid attack of the substrate material, which would particularly occur on galvanized substrate material.

EP 1 319 694 A1 discloses an agent and a process for stripping lacquer from metal surfaces, particularly from metal surfaces made of non-ferrous metals such as aluminum or aluminum alloys. The main component of the organic paint stripper is an alcoholic organic solvent. A particularly good paint stripping effect is achieved due to the fact that the paint stripper contains, as an additional component, alkoxylated alkyl alcohols.

Definitions of the Subject Matter According to the Present Invention

The term 'alkyl' as used in the description and in the claims of the present application refers to a saturated linear or branched-chain monovalent hydrocarbon radical having 1 to 30 carbon atoms ($C_1$-$C_{30}$), wherein the alkyl group may optionally be substituted independently with one or more substituents described hereinafter. Examples of alkyl groups include, but are not limited to, methyl, ethyl, propyl, butyl, pentyl, hexyl, heptyl, octyl, nonyl, decyl, undecyl, dodecyl and the higher homologs thereof, while including all isomers thereof.

The term "alkenyl" as used in the description and in the claims of the present application refers to a non-saturated linear or branched-chain monovalent hydrocarbon radical having at least one double bond and having 2 to 30 carbon atoms ($C_2$-$C_{30}$), wherein the alkenyl group may optionally be substituted with one or more substituents described hereinafter. Examples of alkenyl groups include, but are not limited to, ethenyl ($CH_2$=CH—), propenyl ($CH_2$=C($CH_3$)— or $CH_3$—CH=CH—), buta-1,3-dienyl ($CH_2$=CH—CH=CH— or $CH_2$=C(-)—CH=$CH_2$) and the like.

The term 'alkynyl' as used in the description and in the claims of the present application refers to a non-saturated linear or branched-chain monovalent hydrocarbon radical having at least one triple bond and having 2 to 30 carbon atoms ($C_2$-$C_{30}$), wherein the alkynyl group may optionally be substituted independently with one or more substituents described hereinafter. Examples of alkynyl groups include, but are not limited to ethinyl (HC≡C—), propynyl ($CH_3$—C≡CH— or CH≡C—$CH_2$—) and the like.

It may be kept in mind that an alkenyl group may also contain triple bonds and will then also be an alkynyl group, or an alkynyl group may also contain double bonds and will then also be an alkenyl group.

The terms 'cycloalkyl' and 'cycloalkenyl' as used in the description and in the claims of the present application refer to monovalent saturated (cycloalkyl) or unsaturated (cycloalkenyl) hydrocarbon radicals having 5 to 20 carbon atoms ($C_5$-$C_{20}$) which form alicyclic groups, such as cyclopentyl ($C_5H_9$), cyclohexyl ($C_6H_{11}$), cyclohexenyl ($C_6H_9$) and the like. The terms 'cycloalkyl' and 'cycloalkenyl' also include radicals which comprise condensed bicyclic, tricyclic and higher condensed ring systems.

The term 'aryl' as used in the description and in the claims of the present application refers to a monovalent aromatic hydrocarbon radical having 6 to 20 carbon atoms ($C_6$-$C_{20}$) derived by the removal of one hydrogen atom from a single carbon atom of a parent aromatic ring system. Aryl also includes a bicyclic radical comprising an aromatic ring fused to an aromatic carbocyclic ring. Typical aryl groups include, but are not limited to, radicals derived from benzene (phenyl), substituted benzenes, naphthalene and the like. Aryl groups are optionally substituted independently with one or more substituents described herein below.

Alkyl, alkenyl, alkynyl, cycloalkyl, cycloalkenyl, and aryl may each be substituted, wherein at least one hydrogen atom thereof may be substituted by halogen atoms.

The terms 'alkylene', 'alkenylene', 'alkynylene', 'cycloalkylene', and 'cycloalkenylene' as used in the description and in the claims of the present application refer to divalent radicals which are derived from the respective monovalent radicals by further abstraction of a hydrogen atom, i.e., alkylene being derived from alkyl for example.

The term 'halogen' (Hal) as used in the description and in the claims of the present application refers to fluorine (F), chlorine (Cl), bromine (Br), or iodine (I).

The term 'hydrocarbon group' as used in the description and in the claims of the present application refers to a chemical group having a linear or branched-chain backbone which exclusively consists of carbon atoms wherein two neighboring carbon atoms are bonded together via a single bond or double bond or triple bond or are members of an aromatic ring, wherein this backbone further includes hydrogen atoms bonded to the carbon atoms. These hydrogen atoms may in part be substituted by halogen atoms thus forming part of the hydrocarbon group. The hydrocarbon group does not include hydroxy groups. More preferably, a hydrocarbon group may be a linear or branched-chain alkyl, a linear or branched-chain alkenyl, a linear or branched-chain alkynyl, a cycloalkyl, or a cycloalkenyl, including bicyclic, tricyclic and higher condensed alicyclic groups. These compounds are aliphatic hydrocarbon groups. Furthermore, a hydrocarbon group may preferably be an aryl, an arylalkylene, an arylalkenylene, an arylalkynylene, an arylcycloalkylene, or an arylcycloalkenylene, including bicyclic, tricyclic and higher condensed aryl groups, wherein alkylene in arylalkylene, alkenylene in arylalkenylene and alkynylene in arylalkynylene are linear or branched-chain groups as before and wherein cycloalkylene in arylcycloalkylene and cycloalkenylene in arylcycloalkenylene may form higher condensed alicyclic ring systems. In these latter cases the bifunctional groups present one bond to the OH group of the high-boiling alcohol. Hydrocarbon groups which are arylalkylene, arylalkenylene, arylalkynylene, arylcycloalkylene, or arylcycloalkenylene are araliphatic groups. In these latter cases, the bifunctional groups present one bond to the OH group of the high-boiling alcohol. The hydrogen atoms bonded to the cycloalkyl, cycloalkylene, cycloalkenyl, cycloalkenylene, and aryl groups may in part be substituted by halogen atoms, further by alkyl, by alkenyl, and/or by alkynyl groups. More specifically, the term '$C_4$-$C_{30}$ hydrocarbon group' as used herein refers to a group having a backbone comprising 4 to 30 carbon atoms including all backbone carbon atoms comprised in the alkyl, alkenyl, and/or alkynyl groups which substitute hydrogen atoms on the cycloalkyl, cycloalkylene, cycloalkenyl, cycloalkenylene, and aryl groups. Even more specifically, the term '$C_4$-$C_{20}$ hydrocarbon group' as used herein refers to a group having a backbone comprising 4 to 20 carbon atoms including all backbone carbon atoms as described herein before. Likewise, the term '$C_4$-$C_{10}$ hydrocarbon group' as used herein refers to a group having a backbone comprising 4 to 10 carbon atoms including all backbone carbon atoms as described herein before. Accordingly, the term '$C_1$-$C_{20}$ hydrocarbon group' as used herein refers to a group having a backbone comprising 1 to 20 carbon atoms including the backbone carbon atoms as described before. As far as in the meaning of the term '$C_1$-$C_{20}$ hydrocarbon group' a group is referred to, which has one carbon atom only ('$C_1$ hydrocarbon group'), this group is methyl; and as far as in the meaning of the term '$C_1$-$C_{20}$ hydrocarbon group' a group is referred to, which has two carbon atoms ('$C_2$ hydrocarbon group'), this group is ethyl, ethenyl or ethinyl.

The term 'glycol' as used in the description and in the claims of the present application refers to chemical compounds having two hydroxy radicals, i.e., to diol compounds, preferably geminal diol compounds, which are more preferably derived from ethylene glycol (HO—$CH_2$—$CH_2$—OH) or propylene glycol (HO—$CH(CH_3)$—$CH_2$—OH). More preferably, a glycol as used herein is characterized by having one or more glycol structure moieties derived from ethylene glycol or propylene glycol, like —[O—$CH_2$—$CH_2$—O]— or —[O—$C(CH_3)$—$CH_2$—O]—, which are bonded together via ether radical bonds. The number of glycol structure moieties may be from 1 to 10, more preferably from 1 to 5, even more preferably from 1 to 4 (monoethylene glycols, diethylene glycols, triethylene glycols) and most preferably from 2 to 4. The general chemical formula of the glycols is even more preferably HO—[CHR—$CH_2$—O]$_n$H, wherein R is preferably H or methyl and wherein n is an integer ranging from 1 to 10, most preferably from 2 to 4. Examples are monoethylene glycol (HO—$CH_2$—$CH_2$—OH), diethylene glycol (HO[—$CH_2$—$CH_2$—O]$_2$H), triethylene glycol (HO[—$CH_2$—$CH_2$—O]$_3$H) and tetraethylene glycol (HO[—$CH_2$—$CH_2$—O]$_4$H).

The term 'glycol ether' as used in the description and in the claims of the present application refers to ether alcohol compounds which have one hydroxy radical and one ether function which is bonded to a hydrocarbon group. Glycol ethers are preferably derived from glycols by ether bonding a hydrocarbon group to one of the hydroxy radicals. The hydrocarbon group may be a $C_1$-$C_{20}$ hydrocarbon group, as defined herein before, preferably a $C_1$-$C_6$ alkyl group. The general chemical formula of a glycol ether is R'O—[CHR—$CH_2$—O]$_n$H, wherein R is H or alkyl or aryl, wherein R' is a hydrocarbon group, preferably $C_1$-$C_6$ alkyl, and wherein n is an integer ranging from 1 to 10, more preferably from 1 to 4 and most preferably from 2 to 4. Examples are methyl monoethylene glycol ($CH_3$—O—$CH_2$—$CH_2$—OH) and butyl diethylene glycol ($C_4H_9$—O[—$CH_2$—$CH_2$—O]$_2$H).

The term 'amine compounds' as used in the description and in the claims of the present application refers to primary, secondary and tertiary amine compounds having one or more amine compound radicals. The amine compounds are compounds which may have general chemical formula R—$NH_2$, R—NR'H or R—NR'R", wherein R, R' and R" are hydrocarbon groups, wherein the hydrogen atoms of the backbone of the hydrocarbon group may be further substituted by functional groups, including halogen (Hal), hydroxy (OH), carboxy (COOH), ester (COOR, wherein R is $C_1$-$C_6$ alkyl or $C_1$-$C_6$ alkenyl or $C_1$-$C_6$ alkynyl or $C_6$-$C_{10}$ aryl), amide (CONRR', wherein R, R' are, independently, H or $C_1$-$C_6$ alkyl or $C_1$-$C_6$ alkenyl or $C_1$-$C_6$ alkynyl or $C_6$-$C_{10}$ aryl). Examples of amine compounds are preferably branched and unbranched aliphatic amines, more preferably alcohol containing unbranched aliphatic amines such as monoethanol amine (HO—$CH_2$—$CH_2$—$NH_2$), diethanol amine ((HO—$CH_2$—$CH_2$—$)_2$NH) and triethanol amine ((HO—$CH_2$—$CH_2$—$)_3$N).

The term 'acid compound' as used in the description and in the claims of the present application refers to chemical compounds which provide a proton in a liquid which is able to exchange protons.

The term 'hydroxide compound' as used in the description and in the claims of the present application refers to compounds which are able to split off by dissociation $OH^-$-ions and/or to receive a proton if the compound is dissolved in a liquid which is able to exchange protons. Such compounds are typically metal hydroxides, such as alkali metal hydroxide and transition metal hydroxides.

The term 'alkali metal hydroxide' as used in the description and in the claims of the present application refers to lithium hydroxide, sodium hydroxide, potassium hydroxide, rubidium hydroxide, and cesium hydroxide.

The term 'about' as used in the description and in the claims of the present application in connection with concentration values (% by weight) or temperature values or treatment time values or thickness values means the exact (mean) value given as well as a range of concentration values or temperature values or treatment time values or thickness values which is ±30% relative to this mean value. For example, 'about 3% by weight' means exactly 3% by weight and a range from 3% by weight−30% of 3% by weight (=3% by weight−0.9% by weight=2.1% by weight) to 3% by weight+30% of 3% by weight (=3% by weight+0.9% by weight=3.9% by weight), thus yielding a range of from 2.1% by weight to 3.9% by weight. The value ranges defined with 'about' given for the operating temperature or treatment time or thickness are correspondingly understood, with the relative percentage for the temperature values being based in the ° C. scale (±30% of 40° C. is ±12° C.).

Objectives of the Invention

It is therefore a first objective of the present invention to provide a stripping composition which is suited to be used to aggressively and effectively strip paints and other organic coatings from an underlying substrate without harming the substrate material, which is damaged when prior art strippers are used.

It is therefore a second objective of the present invention to provide a stripping composition which may be used in manufacturing sites complying with safety requirements.

SUMMARY AND DETAILED DESCRIPTION OF THE INVENTION

According to a first aspect of the present invention, these objectives are solved by a non-aqueous stripping composition, wherein this composition comprises:
  A—at least one high-boiling solvent at a concentration from 70% by weight to 95% by weight, preferably from 80% by weight to 95% by weight selected from the group, consisting of alcohols having general chemical formula R—OH, wherein R is a $C_4$-$C_{30}$ hydrocarbon group, wherein the high-boiling solvent has a boiling point of at least 100° C.;
  B—at least one, high-boiling co-solvent at a concentration from 2% by weight to 20% by weight, preferably from 4% by weight to 15% by weight selected from the group, consisting of high-boiling glycols, high-boiling glycol ethers and high-boiling amine compounds, wherein the high-boiling co-solvent has a boiling point of at least 100° C.; and
  C—at least one pH-active agent, "so called activator" at a concentration from 0.01% by weight to 5% by weight, which is either selected from the group, consisting of acid compounds or is selected from the group, consisting of hydroxide compounds.

The quantity of all constituents above and optionally added constituents adding up to 100% by weight (wt. %) of the composition or with other words the sum of all constituents does not exceed the total of 100% by weight. For example, if the composition comprises more than three compounds the amount of the at least one high-boiling solvent could be at a concentration from 70% by weight to 90% by weight.

According to a second aspect of the present invention, these objectives are also solved by a method of stripping an organic coating from a substrate, wherein said method comprises the following method steps:
  a—Providing the non-aqueous stripping composition of the present invention;
  b—Bringing the substrate into contact with the stripping composition; and
  c—Removing the organic coating from the substrate, while the stripping composition is maintained at a stripping temperature which is from at least 30° C., preferable from at least 40° C. to at most below the boiling point of any one of components which are comprised in the stripping composition.

According to a third aspect of the invention, these objectives are also solved by an use of the non-aqueous stripping composition for stripping organic coatings such as epoxy coatings, polyester coatings, polyurethane coatings, acrylic coatings, and different types of powder coatings from a substrate or for cleaning or stripping organic materials such as dirt, grease and oils or mixture thereof from a substrate.

It was found that compositions and methods using these compositions according to the present invention lead to more effective and at the same time more gentle stripping compositions in treating the substrates.

Accordingly, the non-aqueous stripping composition of the present invention contains three key components and optionally further components, these three key components being: A—at least one low VOC (volatile organic compound) alcohol; B—at least one glycol and/or glycol ether and/or amine compound; and C—at least one acid compound or at least one hydroxide compound, preferably alkali metal hydroxide.

Preferably the high-boiling co-solvent is high or completely water soluble (completely miscible with water with more than 90 percent co-solvent in water) and have high polarity. Complete water solubility is a key functional property for the co-solvent. Such highly polar co-solvents make the stripping composition effective on a variety of coating types. Moreover, it also helps the rinsing process due to its miscibility with water.

By combining the (primary) high-boiling solvent(s) (high-boiling alcohol having chemical formula R—OH) and the (secondary) high-boiling co-solvent(s) (high-boiling glycol(s), glycol ether(s), amine compound(s)) with the acid compound(s) or hydroxide compound(s), a very efficient removal of the organic coating from the substrate is achieved even at low operating temperature. This is believed to be due to the solvent bringing about its strongest effect on dissolution and removal of polymer coatings and the co-solvent bringing about its more polar nature and polarity, which helps dissolving the acid compound or hydroxide compound (pH-active agent) and which is also believed to improve rinsing of the substrate due to its good miscibility with water.

Due to the aggressiveness and efficiency of stripping the organic coating from the substrate, it is possible to reduce operating temperature of the stripping composition as compared to the operating temperature which is reported to be necessary for efficient stripping in U.S. Pat. No. 7,151,080 B2 for example (operating temperature well above 100° C.). The operating temperature may considerably be reduced to a lower value, to between 60° C. and 90° C., more preferably to between 65° C. and 85° C., for example. Likewise treatment time may be reduced as compared to conventional methods because the stripping composition is much more efficient than prior art compositions. This is due to the combination of the solvent and the co-solvent as compared to the prior art compositions.

The composition aggressively and effectively strips paints and other organic coatings without harming underlying substrates damaged by prior art strippers, over conventional or lower treatment time periods, and at conventional or lower temperatures.

The stripping composition is further made up of components which are stable under the working conditions, especially at the operating temperature needed to effectively remove the organic coatings. Moreover, the composition fulfills the requirements of safety of the staff working with it. From the definition of the stripping composition given herein above, it will be clear that there are four individual main compositions that can be used to achieve the objectives:

1. a first stripping composition containing at least one high-boiling solvent; a least one high-boiling co-solvent selected from the group, consisting of glycols and glycol ethers; and at least one pH-active agent selected from the group, consisting of acid compounds;
2. a second stripping composition containing at least one high-boiling solvent; at least one high-boiling co-solvent selected from the group, consisting of glycols and glycol ethers; and at least one pH-active agent selected from the group, consisting of hydroxide compounds;
3. a third stripping composition containing at least one high-boiling solvent; at least one high-boiling co-solvent selected from the group, consisting of amine compounds; and at least one pH-active agent selected from the group, consisting of acid compounds; and
4. a fourth stripping composition containing at least one high-boiling solvent; at least one high-boiling co-solvent selected from the group, consisting of amine compounds; and at least one pH-active agent selected from the group, consisting of hydroxide compounds.

Compositions 1, 3 and 4 are most preferred.

The stripping composition of the present invention is non-aqueous, which means that the composition is essentially free of water. Some water intake may occur during operation of the stripping procedure from the atmosphere. Preferably, no water is purposely added to the composition. Generally, the water content in the composition also during operation shall be less than 1% by weight, preferably less than 0.5% by weight, more preferably less than 0.1% by weight and most preferably less than 0.01% by weight. Water contained in the composition does not negatively affect stripping performance. But, when water is present in the composition, the stripping composition usually tends to exhibit chemical attack on soft metals, like aluminium, zinc and magnesium. Such chemical attack is believed to be due to ionization of the acid compound or hydroxide compound present in the composition, so that the ions produced due to this ionization can etch these metals. Therefore, by dispensing with water from adding same to the composition, the present invention is appropriate for use on sensitive substrates. Thus, as used herein, the term 'essentially free of water' means a water content at a level which will not ionize the potassium hydroxide or acid component to such an extent that it will attack aluminum, magnesium or zinc substrates.

The high-boiling solvents which may be used in the stripping composition of the present invention may be selected from a variety of different high-boiling alcohols, specifically from those high-boiling alcohols having general chemical formula R—OH the boiling points of which are suitable with an operating temperature of for example 60° C. to 90° C. More preferably, the stripping composition according to the present invention is operated at a temperature in a range of from 65° C. to 85° C., wherein a temperature being set at a higher value within this range is suitable to strip difficult to remove coatings. Accordingly, for safety reasons, it is desirable to have a stripping composition boiling point at least somewhat greater than the anticipated operating temperature. Therefore, selection of an appropriate solvent is primarily made by assessing the boiling point thereof. The boiling point of the solvent shall be at least 10° C., more preferably at least 20° C. and most preferably at least 30° C. above the operation temperature of the stripping composition. Therefore according to the present invention, the boiling point of the at least one high-boiling alcohol will be at least 100° C. It may be as high as 200° C. or 300° C. or even higher, its highest value being limited by the energy being afforded by heating the composition and by the thermal stability of the substrate material. Accordingly, for safety reasons, it is desirable to provide a stripping composition having a boiling point which is at least somewhat greater than the anticipated operating temperature. Consequently, selection of an appropriate solvent is primarily made by assessing the boiling point thereof.

According to a preferred embodiment of the present invention, the stripping composition contains at least one high-boiling solvent which is a compound having general chemical formula R—OH, wherein R is arylalkylene, wherein aryl is preferably a $C_6$-$C_{10}$ aryl and wherein alkylene is preferably a $C_1$-$C_6$ alkylene.

According to an even more preferred embodiment of the present invention, the stripping composition contains at least one high-boiling solvent which is benzyl alcohol ($C_6H_5$—$CH_2$—OH) or another phenylalkylene compound, as good stripping performance has proved to be obtained with benzyl alcohol based stripping compositions.

According to an even more preferred embodiment of the present invention, the stripping composition contains the at least one high-boiling solvent at a concentration of from about 80% by weight to about 95% by weight.

The high-boiling co-solvents which may be used in the stripping composition of the present invention may be selected from a variety of different compounds, selected from high-boiling glycols, high-boiling glycol ethers and high-boiling amine compounds, more preferably from those glycols, glycol ethers and amine compounds, the boiling points of which are suitable with an operating temperature of from for example 60° C. to 90° C. Accordingly, for safety reasons, it is desirable to provide a stripping composition having a boiling point which is at least somewhat greater than the anticipated operating temperature. Consequently, selection of an appropriate co-solvent is primarily made by assessing the boiling point thereof. The boiling point of the co-solvent shall be at least 10° C., more preferably at least 20° C. and most preferably at least 30° C. above the operating temperature of the stripping composition. Therefore according to the present invention, the boiling point of the at least one high-boiling glycols, glycol ethers and amine compounds used in the stripping composition will be at least 100° C. It may be as high as 200° C. or 300° C. or even higher, its highest value being limited by the energy being afforded by heating the composition and by the thermal stability of the substrate material.

According to a preferred embodiment of the present invention, the stripping composition contains at least one high-boiling co-solvent which is a glycol ether or tertiary amine compound.

According to an even more preferred embodiment of the present invention, the stripping composition contains at least one high-boiling co-solvent which is diethylene glycol ether or triethylene glycol ether or tetraethylene glycol ether.

According to an even more preferred embodiment of the present invention, the stripping composition contains at least one high-boiling co-solvent which is diethylene glycol butylether (butyl diethylene glycol or butyl diglycol), as good stripping performance has proved to be obtained with stripping compositions containing this co-solvent.

According to an even more preferred embodiment of the present invention, the stripping composition contains at least one high-boiling co-solvent which is an ethanol amine, most preferably triethanol amine.

According to an even more preferred embodiment of the present invention, the stripping composition contains the at least one high-boiling co-solvent at a concentration of from about 2% by weight to about 20% by weight, more preferably from about 4% by weight to about 15% by weight.

According to a preferred embodiment of the present invention, different hydroxide compounds, more preferably alkali metal hydroxides, may be used as the at least one pH-active agent. Even more preferably, the hydroxide compound, such as sodium hydroxide (NaOH), potassium hydroxide (KOH), or lithium hydroxide (LiOH), may be an alkali metal hydroxide. While LiOH, NaOH or KOH may be used, KOH is generally preferred, as it is more easily dissolved in the stripping composition.

The alkali metal hydroxide may be added either in solid form or as an aqueous solution hydroxide. If added in solid form, the resulting composition does not require heating to drive off any excess water. If added in aqueous liquid form, the composition may have to be heated to above the boiling point of water to drive off any excess water to restore the composition to its desired essentially anhydrous (non-aqueous) condition. Therefore, it is preferable to add the alkali metal hydroxide in solid form.

According to another preferred embodiment of the present invention, use of organic acids as the pH-active agent also boost-up performance like the hydroxide compounds do. The acid compound is preferably an organic acid or may, less preferably, be an inorganic acid, such as sulfuric acid, phosphoric acid, and nitric acid. Use of mineral acids is however, due to its aggressive nature on metals, not a preferred choice. The organic acid may be a carboxylic acid, such as formic acid, acetic acid, propionic acid, glycolic acid, and gluconic acid for example, or a sulfonic acid, such as methane sulfonic acid (MSA), benzene sulfonic acid etc. for example, or a sulfinic acid, such as phenyl sulfinic acid for example, or a sulfamic acid, such as amidosulfonic acid for example. As a most preferred choice at least one pH-active agent is lactic acid because of its low toxicity and mild odor which lowers safety equipment costs.

Besides high boiling solvents and high-boiling co-solvents, the at least one acid compound or at least one hydroxide compound, preferably alkali metal hydroxide, is an essential component in the stripping compositions of the invention. Without it the method of the invention would not show desired performance on all coating types.

According to an even more preferred embodiment of the present invention, the stripping composition contains the at least one pH-active agent at a concentration of from about 0.01% by weight to about 5% by weight. Preferred concentrations of hydroxide compounds ranges from about 0.01% by weight to about 2% by weight, more preferred from about 0.01% by weight to about 1% by weight. Preferred concentrations of acid compounds ranges from about 0.01% by weight to about 5% by weight, more preferably from about 0.5% by weight to about 5% by weight.

According to a preferred embodiment of the present invention, the stripping composition further comprises at least one surfactant, including a mixture of surfactants. Use of surfactants is not an absolute requirement in the composition of the present invention and the invention works well without adding any surfactant due to fast and gentle removal of the organic coating. Inclusion of surfactants enhances stripping performance of the stripping process due to superior coating penetration abilities of the stripping composition and also enhances rinsing off the stripping solution after removal of the coating from the substrates and final appearance of the metal surface after stripping of organic coating.

One further advantage of the present invention is that preferred surfactant levels are lower than those found in prior art strippers. Moreover, if low foaming surfactants or proper blending of low HLB and high HLB surfactants are used in the present invention, the surfactants additionally help the rinsing off the stripping solution from the treated parts and at the same time, they also control the foaming issues in the subsequent rinsing step. Thus, there is no real foaming problem arising, defoaming agents or other counter measures are not required. Thereby efficiencies of the stripping process along with its cost-effectiveness may be improved.

According to a further preferred embodiment of the present invention, the at least one surfactant is a non-ionic surfactant or a mixture of non-ionic surfactants or at least one non-ionic surfactant and at least one anionic surfactant.

The non-ionic and/or anionic surfactant seems to help penetration of the high-boiling solvents and high-boiling co-solvents into the polymer coatings and also help in rinsing. pH-active agents such as hydroxide compound, preferably alkali metal hydroxide, or acid compound help breakdown of crosslinked polymer coatings.

According to an even more preferred embodiment of the present invention the at least one surfactant is preferably not an alkyl phenol ethoxylate. Therefore, the stripping composition of the invention is preferably free of such compounds so called APE's.

Appropriate non-ionic surfactants include alcohol ethoxylate, secondary alcohol ethoxylate, ethoxylated/propoxylated $C_8$-$C_{10}$ alcohols, etc. are good candidates. These compounds can offer enhancement in process performance along with adequate biodegradability. Role of surfactants is to improve penetration/diffusion of the stripping composition into the coating film, to make it softer and break the bond between the coating film and the base substrate. It also improves rinsing off of the stripping solution.

According to an even more preferred embodiment of the present invention, the stripping composition contains the at least one surfactant at a concentration of from about 0.5% by weight to about 5.0% by weight. With respect to the surfactant level, an even more preferred surfactant concentration range in the stripping composition is from about 0.5% by weight to about 2.0% by weight. However, testing on a variety of surfactant products reveals that where a non-ionic ethoxylated or propoxylated $C_8$-$C_{10}$ alcohol or secondary alcohol ethoxylate (such as Triton and Tergitol products from Dow Chemicals) is used, surfactant levels from higher amounts e.g. higher than 5% by weight to about 15% by weight and above do not show any noticeable increase in performance. On the other hand, it makes process more expensive to use the at least one surfactant at an increased concentration without any real benefit in process performance. Thus, one preferred range for surfactant level is from about 0.5% by weight to about 2% by weight.

In a most general way of description of the invention, the stripping composition contains three key components. In a preferred embodiment, these key components are combined within specified relative proportions: In a preferred embodiment of the present invention, the stripping composition may comprise:

A—from about 80% by weight to about 95% by weight, of the at least one high-boiling solvent;

B—from about 4% by weight to about 15% by weight, of the at least one high-boiling co-solvent; and C—from about 0.01% by weight to about 1% by weight, of the at least one pH-active agent, i.e., the acid compound or the hydroxide compound, preferably alkali metal hydroxide, wherein the components A, B and C make up for 100% by weight of the stripping composition. If the stripping composition contains more than one compound of the respective components A, B, C, the concentrations given herein before denote the overall concentration of all compounds of the respective one of these components.

According to an even more preferred embodiment of the present invention, the stripping composition contains benzyl alcohol as the at least one high-boiling solvent and at least one high-boiling glycol, glycol ether or amine compound as the co-solvent, in addition to the at least one pH-active agent, i.e., acid compound or hydroxide compound. In this case, the amount of benzyl alcohol is preferably >80% (up to 90%) by weight. Inclusion of high-boiling point glycol, glycol ether or amine compound at a preferred >4% by weight level provides needed polar property in the composition for stripping of a variety of coating types.

In another preferred embodiment of the present invention, the stripping composition further comprises at least one surfactant and accordingly comprising the components as follows:

A—from about 70% by weight to about 90% by weight, more preferably from about 80% by weight to about 90% by weight, of the at least one high-boiling solvent;

B—from about 2% by weight to about 20% by weight, more preferably from about 5% by weight to about 15% by weight, of the at least one high-boiling co-solvent;

C—from about 0.01% by weight to about 5% by weight, more preferably from about 0.2% by weight to about 1% by weight, of the at least one acid compound or of the at least one hydroxide compound, preferably alkali metal hydroxide; and D—from about 0.5% by weight to about 5% by weight, more preferably from about 0.5% by weight to about 2% by weight, of the at least one surfactant, preferably a non-ionic surfactant or a mixture of non-ionic and anionic surfactants, wherein the components A, B, C and D make up for 100% by weight of the stripping composition. If the stripping composition contains more than one compound of the respective components A, B, C, D, the concentrations given herein before denote the overall concentration of all compounds of the respective one of these components.

If the stripping composition contains even further components in addition to components A, B, C, D above, the respective percentage will be adjusted accordingly.

The substrates which may purposefully be treated with the stripping composition of the present invention may be made of steel, galvanized steel, zinc die-cast, wrought and die-cast aluminum alloys, brass, copper products, aluminum, aluminum die-cast products, brass, bronze, copper, titanium, magnesium, plated substrates and other substrates. Due to a relatively lower operating temperature range (as compared to prior art compositions), it can even be used for the removal of organic coatings from non-metallic substrates, such as plastics, for example an engineering plastics substrate.

Typical automotive components stripped include exterior sheet metal components, aluminum wheels and plastic headlight housings. Non-automotive components include architectural hardware, lighting components, plumbing fixtures and electronics housings. The preferred application of the stripping composition and method of the present invention is the stripping of organic-based systems.

The preferred application of the stripping composition and method of the present invention is the stripping of organic coatings from substrates e.g. made of steel, stainless steel, galvanized steel, zinc die-cast, wrought and die-cast aluminum alloys, brass, copper products, aluminum, aluminum die-cast products, brass, bronze, copper, titanium, magnesium, and plated substrates. These coatings include: electrodeposition coatings, powder coatings (acrylics, polyesters, TGIC, epoxies, urethanes (PU) and hybrid formulations), primer coatings (acrylics, epoxies and urethanes), solvent-based and water-based organic coatings (primarily acrylics, urethanes and epoxies), and one-component (1K) and two-component (2K) clearcoat technologies (primarily acrylic and urethane formulas). Certain enamels and lacquer coatings can also be removed. An exemplary list of the types of common coatings that may be stripped according to the present invention includes: cathodic and anodic electrocoats (both lead and non-lead types); powder primers (epoxies, polyesters, hybrids and acrylic types); powder monocoats, such as epoxy, acrylic, polyester TGIC and TGIC-free, etc.; liquid monocoats, such as epoxy, acrylic, PU 2K etc.; acrylic clearcoats; and liquid solvent basecoats; composite coatings with multiple layers may also be successfully stripped. An exemplary list includes: epoxy coats ("E-coats") with epoxy powder coat; E-coats plus epoxy wet paint; epoxy primer plus PU 2K wet paint.

Apart from stripping of paint, lacquer and enamel coatings, the stripping composition and method of the present invention can also be used for cleaning or stripping other organic materials such as, for example, dirt, grease and oils, from substrates e.g. made of steel, galvanized steel, zinc die-cast, wrought and die-cast aluminum alloys, brass, copper products, aluminum, aluminum die-cast products, brass, bronze, copper, titanium, magnesium, and plated substrates.

Aluminum wheels can thus be cleaned in a range of from about 5 to about 30 minutes at 65° C. to 87° C.). Other appropriate applications include treatment of engine components that have organic soils, such as grease, carbon, oils etc.

According to the present invention, the stripping composition is preferably used in a dip or immersion process, wherein a series of parts or batches of parts are submerged into the stripping composition. Each part or batch is treated for a time sufficient to either completely strip the specific coating or to loosen it enough to be rinsed off in a subsequent step. In an alternative embodiment the stripping composition is used in spray stripping applications. Since in spray stripping applications the physical energy of spray mode also plays important role, normally spray stripping is used at somewhat lower operating temperature than compared with dip or immersion condition. Typical pressure is around 0.5-10 bar, preferably about 5 bar.

The treatment time required in the composition varies depending upon the particular coating or residue being treated, the thickness of the coating or residue, the acid or hydroxide compound content in the composition, and the operating temperature of the composition. The treatment time may be as little as a few minutes to as much as several hours depending upon the nature of the coating, the thickness thereof and the uniformity of the coating. Most preferably treatment time is from about 0.5 min to about 300 min, preferably from about 10 to about 120 min. When the substrate with the treated coating is removed from the bath, a post treatment, such as a water rinse or water spray, may be performed to remove any vestiges of the coating or residue left. In some cases, however, such post treatment is not necessary.

The operating temperature of the stripping composition may be set to at least about 30° C., preferably at least about 40° C., more preferably to at least about 60° C. and even more preferably to at least about 65° C. Furthermore, the operating temperature of the stripping composition may be set to at most about 150° C. or even higher, more preferably to at most about 90° C. and even more preferably to at most about 85° C. According to an even more preferred embodiment of the present invention, the operating temperature of the stripping composition is from about 65° C. to about 85° C.

Normally stripped coating material stays in the stripping composition and accumulates in the stripping bath over time. If partially stripped parts still having patches of soft residues of coatings are transferred to a rinse bath, these residues may be removed in this rinse step. In this case, it is possible to reduce the rate of coating accumulation in the stripping bath and to advantageously extend the bath life.

The stripping composition may also be sprayed onto the substrate surface to be stripped. It may be used in combination with an immersion soak, either preceded or followed by spray application, or both.

A preferred mode of operation to strip coatings from a substrate comprises the following steps:
 a. providing the stripping composition of the present invention in a tank device;
 b. bringing the substrate into contact with the stripping composition in the tank device;
 c. heating the stripping composition to a temperature of from about 60° C. to about 90° C. for a period of time from about 15 min to about 200 min and thereby removing or loosening the cured organic coating from the substrate;
 d. completely removing the organic coating from the substrate by applying a high pressure water spray to the substrate surface.

The high pressure water spray applied in step d. generally has a pressure of from 5 Bar to 250 Bar.

The following examples more clearly explain the present invention while not restricting its scope to the exemplary embodiments.

EXAMPLES 1 (COMPARATIVE EXAMPLES AND EXAMPLE ACCORDING TO THE INVENTION)

In first experiments the effect of individual components of the stripping composition of the present invention are tested under three different conditions for their effect on removal of organic coatings:
 I. Benzyl alcohol (BA: solvent according to the invention) only was used as it is (100% by weight BA);
 II. BA was used together with 10% by weight triethanol amine (TEA: co-solvent according to the invention) (90% by weight BA, 10% by weight TEA); and
 III. 0.1% by weight potassium hydroxide (KOH: pH-active agent according to the invention) was added into the mixture of BA+TEA (89.95% by weight BA, 9.95% by weight TEA, 0.1% by weight KOH).

All three solutions were heated to 75° C. and polyester powder coated steel panels (about 70 μm thick coatings) were used for testing stripping performance.
 I. (BA only): Little lifting of coating was observed after 10 min (comparative example);
 II. (BA+TEA): Some swelling and lifting and partial removal (50%) of organic coating was observed (comparative example);
 II. (BA+TEA+KOH): Almost 95% of organic coating was removed (composition according to the invention).

Paint stripping of a coating is possible with BA (solvent) only, but it takes too long. With combination of a second component (KOH: pH-active agent), it shows somewhat better performance. If the third component (glycol: co-solvent) was added on top of the BA-KOH mixture, it further enhanced performance. These examples show how why the process requires certain components to achieve optimum performance. The inclusion of surfactant(s) further enhances the performance (see Examples below).

EXAMPLES 2 (COMPARATIVE EXAMPLES)

Three high-boiling point solvents and co-solvents, namely benzyl alcohol (BA: high-boiling solvent), 2-ethyl hexanol (6-ol: high-boiling solvent), and diethylene glycol butylether (d-bGly: high-boiling co-solvent), were separately tested together with 0.1% by weight potassium hydroxide (KOH) for their paint stripping performance: All three compositions were heated to 75° C. and then polyester powder coated steel panels were stripped in the stripping compositions.
 I. BA (high-boiling solvent) was used together with 0.1% by weight KOH (pH-active agent according to the invention) (99% by weight BA, 0.1% by weight KOH);
 II. 6-ol (high-boiling solvent) was used together with 0.1% by weight KOH (99% by weight 6-01, 0.1% by weight KOH);
 III. d-bGly (high-boiling co-solvent) was used together with 0.1% by weight KOH (99% by weight d-bGly, 0.1% by weight KOH).

All compositions were heated to 75° C. and then polyester powder coated steel panels were stripped in the stripping compositions.
- I. (BA+KOH): This composition was able to strip off the coating within 20 min with some small residues left on the substrate;
- II. (6-O1+KOH) 2-Ethyl hexanol+KOH showed slowest strip rate;
- III. (d-bGly+KOH) This composition was the second best in the performance with almost double the strip time.

Lifting off the coating with composition I. (BA+KOH) is possible, but requires long treatment time.

EXAMPLES 3A (COMPARATIVE EXAMPLES)

Mixtures of benzyl alcohol (BA: high-boiling solvent) together with monoethanol amine (MEA: high-boiling co-solvent), diethanol amine (DEA: high-boiling co-solvent), or triethanol amine (TEA: high-boiling co-solvent) at 90:10% by weight ratios (BA+MEA or BA+DEA or BA+TEA) were tested for removal of organic coatings. All solutions were tested at 75° C. using polyester powder coated steel panels.

At the end of a 10 min treatment time, 50-80% coating was removed. The MEA containing composition showed the highest degree on removal followed by DEA and then TEA. Strong amine smell and high degree of amine vapor was observed in the MEA and DEA containing compositions. The composition with TEA did not produce any noticeable amine vapor or amine smell.

These examples show the beneficial effect of an amine compound as a high-boiling co-solvent in paint stripping compositions. Low molecular weight amine compounds, such as methyl amine, ethyl amine, monoethanol amine etc., work good as co-solvents, but their high volatility and objectionable smell make their use limited in commercial products. High molecular weight amine compounds, such as DEA and TEA, are a better choice as high-boiling co-solvents.

EXAMPLES 3B (COMPARATIVE EXAMPLES)

A mixture of benzyl alcohol (BA: high-boiling solvent) at 20% by weight and butyl diglycol (high-boiling co-solvent) at 74% by weight was tested together with potassium hydroxide (KOH flakes: pH-active agent) 1.0% at weight and n-octanol×4 ethylene oxide (surfactant) at 5% at weight. The stripping composition was tested for stripping of steel panels coated with 'Epoxy powder coating' at 80° C. Poor stripping was observed with about 60% coating removal after 90 minutes.

EXAMPLES 3C (COMPARATIVE EXAMPLES)

A mixture of triethanol amine (TEA: high-boiling co-solvent) at 79% by weight and butyl diglycol (high-boiling co-solvent) at 20% by weight was tested together with potassium hydroxide (KOH flakes: pH-active agent) 1.0% at weight. The stripping composition was tested for stripping of steel panels coated with 'Epoxy powder coating' at 80° C. Poor stripping was observed with about 50-60% coating removal after 120 minutes.

Above example indicates that mixture of two highly hydrophilic (water soluble) co-solvents doesn't performs as good as the mixture of partially water soluble high boiling point solvent and hydrophilic secondary solvent.

EXAMPLES 4A (EXAMPLES ACCORDING TO THE INVENTION)

A mixture of benzyl alcohol (BA: high-boiling solvent) and triethanol amine (TEA: high-boiling co-solvent) and a mixture of benzyl alcohol (BA: high-boiling solvent) and diethylene glycol butylether (d-bGly: high boiling co-solvent) at 90:10% by weight ratios (BA+TEA or BA+d-bGly) were tested together with 0.5% potassium hydroxide (KOH: pH-active agent). Both stripping compositions (I. 89.55% by weight BA+9.95% by weight TEA+0.5% by weight KOH; II. 89.55% by weight BA+9.95% by weight b-dGly+0.5% by weight KOH) were heated to 75° C. and tested for removal of TGIC and epoxy powder coating and epoxy e-coating. Both stripping compositions removed the TGIC polyester powder coating within 10 min and the epoxy e-coating and epoxy powder coating within 15 min.

EXAMPLES 4B (EXAMPLES ACCORDING TO THE INVENTION)

A mixture of benzyl alcohol (BA: high-boiling solvent) at 74% by weight and butyl diglycol (high-boiling co-solvent) at 20% by weight was tested together with potassium hydroxide (KOH flakes: pH-active agent) 1.0% at weight and n-octanol×4 ethylene oxide (surfactant) at 5% at weight. The stripping composition was tested for stripping of steel panels coated with 'Epoxy powder coating' at 80° C. Good stripping was observed with complete removal of coating after about 15 minutes. Rinsing of stripped panel was uniform in appearance without any spotting.

This example clearly shows the beneficial effect of the combination of high amounts of high boiling solvent with lower amounts of high-boiling co-solvent in paint stripping compositions.

EXAMPLES 4C (EXAMPLES ACCORDING TO THE INVENTION)

A mixture of benzyl alcohol (BA: high-boiling solvent) at 79% by weight and butyl diglycol (high-boiling co-solvent) at 20% by weight was tested together with potassium hydroxide (KOH flakes: pH-active agent) 1.0% at weight. In contrast to Example 4b the composition did not comprise any surfactant. The stripping composition was tested for stripping of steel panels coated with 'Epoxy powder coating' at 80° C. Good stripping was observed with complete removal of coating after about 15 minutes. Rinsing of stripped panel was non-uniform in appearance with some spotting and strakes on the metal surface in direct comparison with Example 4b.

This example shows again the beneficial effect of the combination of high amounts of high boiling solvent with lower amounts of high-boiling co-solvent in paint stripping compositions in view of fast and complete removal of coating after about 15 minutes. On the other hand it shows in comparison to Example 4b that surfactants show improvements in view of surface appearance of the treated substrates.

EXAMPLES 5 (EXAMPLES ACCORDING TO THE INVENTION)

Six different stripping compositions which are described in Table 1 were tested at 85° C. for their paint and powder coating stripping performance. The high-boiling solvent was again benzyl alcohol (BA), the high-boiling co-solvent was diethylene glycol butylether (d-bGly) and the pH-active agent was potassium hydroxide (KOH).

The different non-ionic surfactant types which were used are shown in Table 1. They were tested due to their low-foaming properties. But of course, use of surfactants is not just limited to only this class of surfactants. A wide range of non-ionic and anionic surface active agents are possibly used as additives for performance enhancement.

Steel panels were coated with TGIC and TGIC-free polyester powder coatings, epoxy powder coating, epoxy e-coat, epoxy wet paint, PU 2K wet paint as well as multiple coatings, such as epoxy primer-PU 2k top coat, epoxy primer-epoxy powder coat, and epoxy e-coat-acrylic top coat/cleat coat. Coating thickness of single coats was approx. 70 μm except for e-coating, which was about 20 μm. For multiple coatings/double coatings, thickness was from 90 to 130 μm.

All types of single coats were removed within 15 min, while double coats were removed during a treatment time of from 20 min to 25 min.

All compositions containing these surfactants yield the same positive result, so that it is not necessary to use any one specific category of surfactant. If the surfactant is compatible with the process and acceptable for regulatory point of view, it can be used in the process. The role of the surfactant is just for further enhancement of performance (speed of stripping of the coating). Process still works without the surfactant, but at slower speed and may show poor rinsing.

EXAMPLES 6 (EXAMPLES ACCORDING TO THE INVENTION)

Compositions 1 and 2 of Examples 5 were tested for their stripping performance on non-ferrous substrates and for their attack on the substrate materials. Epoxy and TGIC polyester powder coatings and PU 2K wet paint coated cast aluminum, wrought aluminum, zinc die-cast and magnesium parts were used for the test. Both compositions were tested at 80° C.

No chemical attack was observed on alkali sensitive substrates, like cast and wrought aluminum and zinc die-cast substrates after removal of the organic coating.

Uncoated polished/mirror-finished aluminum 6061 panels were used in the testing to check the possible chemical attack (etching). As both the compositions were free of water and did not show ionic activity, no chemical attack was observed in either of these compositions.

All coating types on different substrates were completely stripped off within 15 min. After rinsing with cold water, the surfaces of all the substrates were free of any paint residues. In the case of polished aluminum panel, the surface was shiny without any obvious chemical attack.

EXAMPLES 7 (EXAMPLES ACCORDING TO THE INVENTION)

Like Examples 4, a mixture of benzyl alcohol (BA: high-boiling solvent) and triethanol amine (TEA: high-boiling co-solvent) and a mixture of BA and diethylene glycol butylether (d-bGly: high-boiling co-solvent) at 90:10% by weight ratios (BA+TEA, BA+d-bGly) were tested. But instead of potassium hydroxide, lactic acid (LA: pH-active agent) was used as a pH-active agent at 5% by weight level (I. 85.5% by weight BA+9.5% by weight TEA+5% by weight LA; II. 85.5% by weight BA+9.5% by weight d-bGly+5% by weight LA).

Both compositions (I. BA+TEA+LA, II. BA+b-dGly+LA) were heated to 80° C. and tested for removal of TGIC and epoxy powder coating and epoxy e-coating. Both compositions removed the TGIC polyester powder coating within 8 min and the epoxy e-coating within 10 min and the epoxy powder coating within 14 min.

EXAMPLES 8 (EXAMPLES ACCORDING TO THE INVENTION)

The compositions described in Example 7 were tested on non-ferrous substrates, namely aluminum and galvanized steel panels, which were coated with TGIC powder coating. The stripping test was conducted at 80° C.

Both coated panels were stripped within 8 min and no chemical attack was observed on the base substrates.

In addition, uncoated polished/mirror-finished aluminum 6061 panels were also immersed in the stripping solution for 10 min to check possible chemical attack (etching). Both compositions were tested at 80° C.

As both the compositions were free of water, due to a lack of ionic activity, no chemical attack/etching on aluminum was observed in either of the compositions.

EXAMPLES 9 (EXAMPLES ACCORDING TO THE INVENTION)

A mixture of benzyl alcohol (BA: high-boiling solvent) at 91% by weight and butyl diglycol (high-boiling co-solvent) at 7% by weight was tested together with potassium hydroxide (KOH flakes: pH-active agent) 0.5% at weight and Tergitol 15-S-3 (non-ionic surfactant, CAS Number 68131-40-8) at 2% at weight. The stripping composition was tested for stripping of stainless steel rack coated with about 650 μm thick polyester powder coating. The stripping was done by spray stripping at 50° C. and 2 bar spray pressure.

Within 55 minutes, all the coating was stripped off. Metal surface after stripping and rinsing was uniform without any spotting. Good stripping was observed with complete removal of coating after about 15 minutes. Rinsing of stripped panel was uniform in appearance without any spotting.

EXAMPLES 10 (COMPARATIVE EXAMPLES)

Compositions 1 and 2 of Examples 5 were tested with water at 1% by weight for their stripping performance on non-ferrous substrates and for their attack on the substrate materials. Epoxy and TGIC polyester powder coatings and PU 2K wet paint coated cast aluminum, wrought aluminum, zinc die-cast and magnesium parts were used for the test. Both compositions were tested at 80° C.

Significant chemical attack was observed on alkali sensitive substrates, like cast and wrought aluminum and zinc die-cast substrates after removal of the organic coating.

Uncoated polished/mirror-finished aluminum 6061 panels were used in the testing to check the possible chemical attack (etching). As both the compositions contained water, due to ionic activity, significant chemical attack was observed in both of these compositions.

EXAMPLES 11 (COMPARATIVE EXAMPLES)

A slightly changed mixture according to inventive Example 4b, comprising benzyl alcohol (BA: high-boiling solvent) at 74% by weight and butyl diglycol (high-boiling co-solvent) at 20% by weight was tested together with potassium hydroxide (KOH flakes: pH-active agent) 1.0% at weight and n-octanol×4 ethylene oxide (surfactant) at 5% at weight. In contrast to Example 4b 2% water (D.I. water) was added wherein the amount of the forenamed compounds were slightly diluted. The stripping composition was tested for stripping of aluminum panels coated with 'Epoxy powder coating' at 80° C. Good stripping was observed with complete removal of coating after about 13 minutes with some swelling of stripped off paint film. Rinsing of stripped panel was uniform in appearance without any spotting but strong chemical attack (etching) was observed on base metal.

This example clearly shows the beneficial effect using a non-aqueous composition and preventing that water is purposely or unintended added to the composition according to the invention.

CONCLUSION

What is new and unexpected is, according to the present invention, a stripping composition, comprising at least one high-boiling solvent, selected from the group, consisting of high-boiling alcohols, and at least one high-boiling co-solvent, selected from the group, consisting of glycols, glycol ethers and amine compounds, and a pH-active agent, selected from the group, consisting of acid compounds or selected from the group, consisting of hydroxide compounds, more preferably organic acid compounds or alkali metal hydroxide compounds, and a method wherein this stripping composition is used. This stripping composition is very effective and aggressive in removing organic coatings, such as wet paints and powder coatings at relative low operating temperature. It also takes less stripping time as compared to prior art stripping compositions and methods. This composition may optionally additionally contain at least one non-ionic surfactant or surfactant mixture. Moreover, the stripping composition of the present invention does not show any attack on the substrate surface, especially of soft metals, like aluminum, galvanized steels, and zinc die-cast. Lower operating temperature offers better operators' safety and lower energy cost. Low VOC, low toxicity solvent(s) and co-solvent(s) as well as biodegradable surfactant(s) offer an environmentally friendly process which is due to the superior performance of the stripping composition much easier and more efficiently executable.

The invention claimed is:

1. A non-aqueous stripping composition, comprising:
   A—at least one high-boiling solvent at a concentration from 70% by weight to 95% by weight selected from the group, consisting of alcohols having general chemical formula R—OH, wherein R is a $C_4$-$C_{30}$ hydrocarbon group, wherein the high-boiling solvent has a boiling point of at least 100° C.;
   B—at least one high-boiling co-solvent at a concentration from 2% by weight to 20% by weight selected from the group, consisting of high-boiling glycols, glycol ethers and amine compounds, wherein the high-boiling co-solvent has a boiling point of at least 100° C.; and
   C—at least one pH-active agent at a concentration from 0.01% by weight to 5% by weight selected from the group, consisting of acid compounds or selected from the group, consisting of hydroxide compounds.

2. The stripping composition of claim 1, wherein
   B—the at least one high-boiling co-solvent is selected from the group, consisting of amine compounds, wherein the high-boiling co-solvent has a boiling point of at least 100° C.; and
   C—at least one pH-active agent selected from the group, consisting of acid compounds or selected from the group, consisting of hydroxide compounds.

3. The stripping composition of claim 1, wherein
   B—the at least one high-boiling co-solvent is selected from the group, consisting of high-boiling glycols and glycol ethers, wherein the high-boiling co-solvent has a boiling point of at least 100° C.; and
   C—at least one pH-active agent selected from the group, consisting of acid compounds.

4. The stripping composition of claim 1, wherein the composition further comprises at least one surfactant.

5. The stripping composition of claim 4, wherein the at least one surfactant is a non-ionic surfactant or a non-ionic/anionic surfactant mixture.

6. The stripping composition of claim 1, wherein the at least one high-boiling solvent is a compound wherein R is arylalkyl.

7. The stripping composition of claim 1, wherein the at least one high-boiling solvent is benzyl alcohol.

8. The stripping composition of claim 1, wherein the at least one high-boiling co-solvent is a glycol ether or tertiary amine compound.

9. The stripping composition of claim 1, wherein the at least one high-boiling co-solvent is a diethylene glycol ether or triethylene glycol ether or tetraethylene glycol ether.

TABLE 1

| | Component | Composition 1 Content [% by weight] | Composition 2 Content [% by weight] | Composition 3 Content [% by weight] | Composition 4 Content [% by weight] | Composition 5 Content [% by weight] | Composition 6 Content [% by weight] |
|---|---|---|---|---|---|---|---|
| Solvent | Benzyl alcohol (BA) | 87.50 | 87.50 | 87.50 | 87.50 | 87.50 | 87.50 |
| Co-Solvent | Triethanol amine (TEA) | 10.00 | | 10.00 | | 10.00 | |
| Co-Solvent | Butyldiglycol *) (d-bGly) | | 10.00 | | 10.00 | | 10.00 |
| pH-active Agent | Potassium hydroxide (KOH) | 0.50 | 0.50 | 0.50 | 0.50 | 0.50 | 0.50 |
| Surfactant | Tergitol 15-S-12 [1]) | 1.00 | 1.00 | | | | |
| Surfactant | Tergitol 15-S-3 [2]) | 1.00 | 1.00 | | | | |
| Surfactant | Triton DF 12 [3]) | | | 2.00 | 2.00 | | |
| Surfactant | Triton DF 16 [4]) | | | | | 2.00 | 2.00 |

*) diethylene glycol butylether
[1]) secondary alcohol ethoxylate
[2]) secondary alcohol ethoxylate
[3]) polyethylene/polypropylene glycol monobenzylether with $C_8$-$C_{10}$ alcohol
[4]) ethoxylated/propoxylated $C_8$-$C_{10}$ alcohol 10. The stripping composition of claim 1, wherein the at least one high-boiling co-solvent is diethylene glycol butylether.

11. The stripping composition of claim 1, wherein the at least one high-boiling co-solvent is triethanol amine.

12. The stripping composition of claim 1, wherein the at least one pH-active agent is an organic acid.

13. The stripping composition of claim 1, wherein the at least one pH-active agent is lactic acid.

14. The stripping composition of claim 1, wherein the water content in the composition is less than 0.5% by weight.

15. A method of stripping an organic coating from a substrate, said method comprising the following method steps:
 a—providing the non-aqueous stripping composition of claim 1;
 b—bringing the substrate into contact with the stripping composition; and
 c—removing the organic coating from the substrate, while the stripping composition is maintained at a stripping temperature which is from at least 30° C. to at most below the boiling point of any one of components which are comprised in the stripping composition.

16. The method of claim 15, wherein the substrate is an aluminium, magnesium, zinc, stainless steel, or engineering plastics substrate.

17. The method of claim 15, wherein the operation temperature of the stripping composition is from 65° C. to 85° C.

18. The method of claim 15, wherein the substrate is coated with organic coatings selected from epoxy coatings, polyester coatings, polyurethane coatings, acrylic coatings, and powder coatings.

19. A method of stripping organic coatings selected from epoxy coatings, polyester coatings, polyurethane coatings, acrylic coatings, and powder coatings from a substrate made of steel, galvanized steel, zinc die-cast, wrought and die-cast aluminum alloys, brass, copper products, aluminum, aluminum die-cast products, brass, bronze, copper, titanium, magnesium, or a plated substrate, said method comprising the following method steps:
 a—providing the non-aqueous stripping composition of claim 1;
 b—bringing the substrate into contact with the stripping composition; and
 c—removing the organic coating from the substrate, while the stripping composition is maintained at a stripping temperature which is from at least 30° C. to at most below the boiling point of any one of components which are comprised in the stripping composition.

20. A method of cleaning or stripping organic materials selected from grease and oils or mixture thereof from a substrate made of steel, galvanized steel, zinc die-cast, wrought and die-cast aluminum alloys, brass, copper products, aluminum, aluminum die-cast products, brass, bronze, copper, titanium, magnesium, or a plated substrate, said method comprising the following method steps:
 a—providing the non-aqueous stripping composition of claim 1;
 b—bringing the substrate into contact with the stripping composition; and
 c—removing the grease and oils or mixture thereof from the substrate, while the stripping composition is maintained at a stripping temperature which is from at least 30° C. to at most below the boiling point of any one of components which are comprised in the stripping composition.

* * * * *